Nov. 20, 1934.  G. W. MUDD  1,981,278

LABELING MACHINE

Filed Aug. 30, 1932  11 Sheets-Sheet 1

Inventor:
Garrett W. Mudd
By Bob Jochum
Atty.

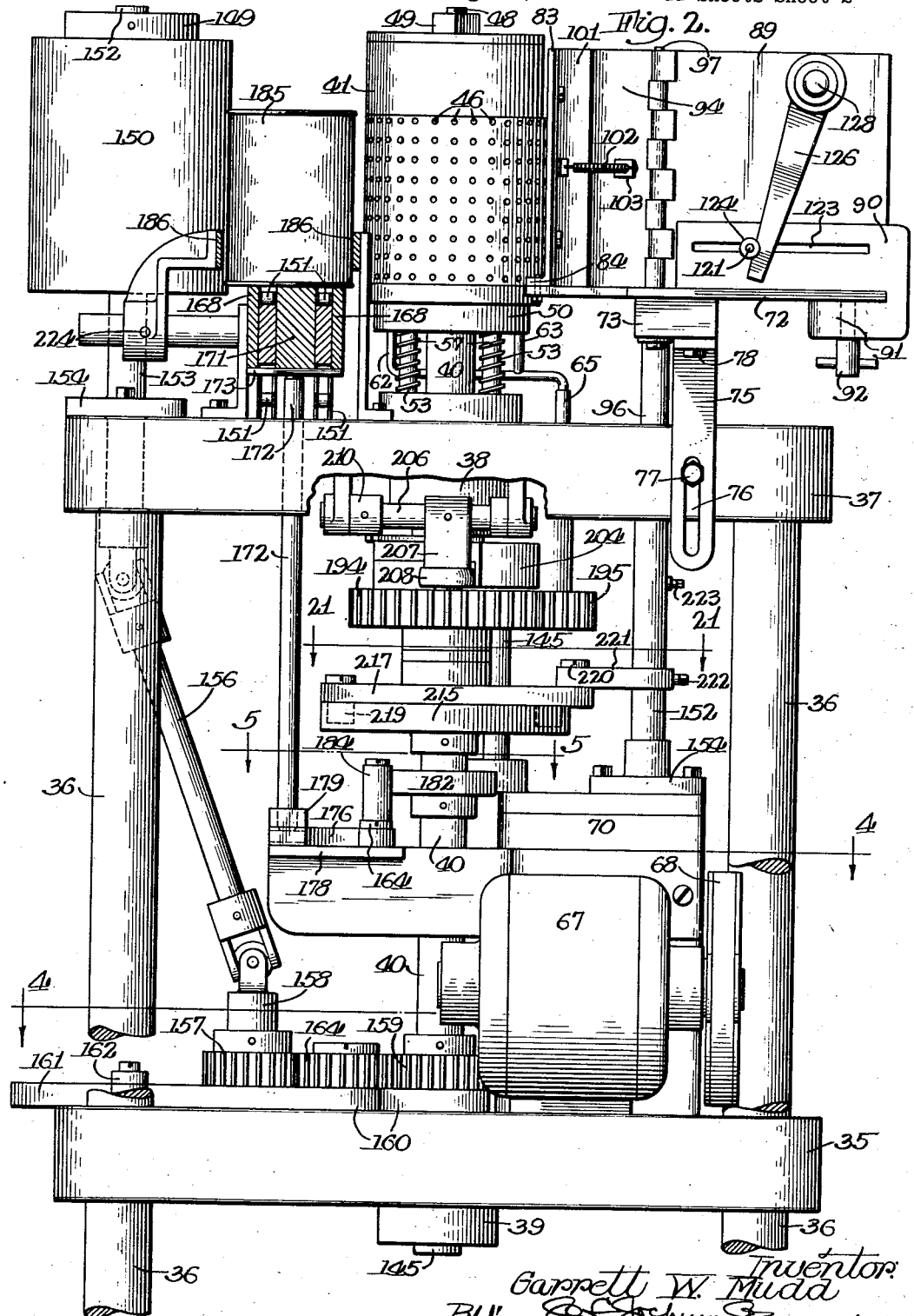

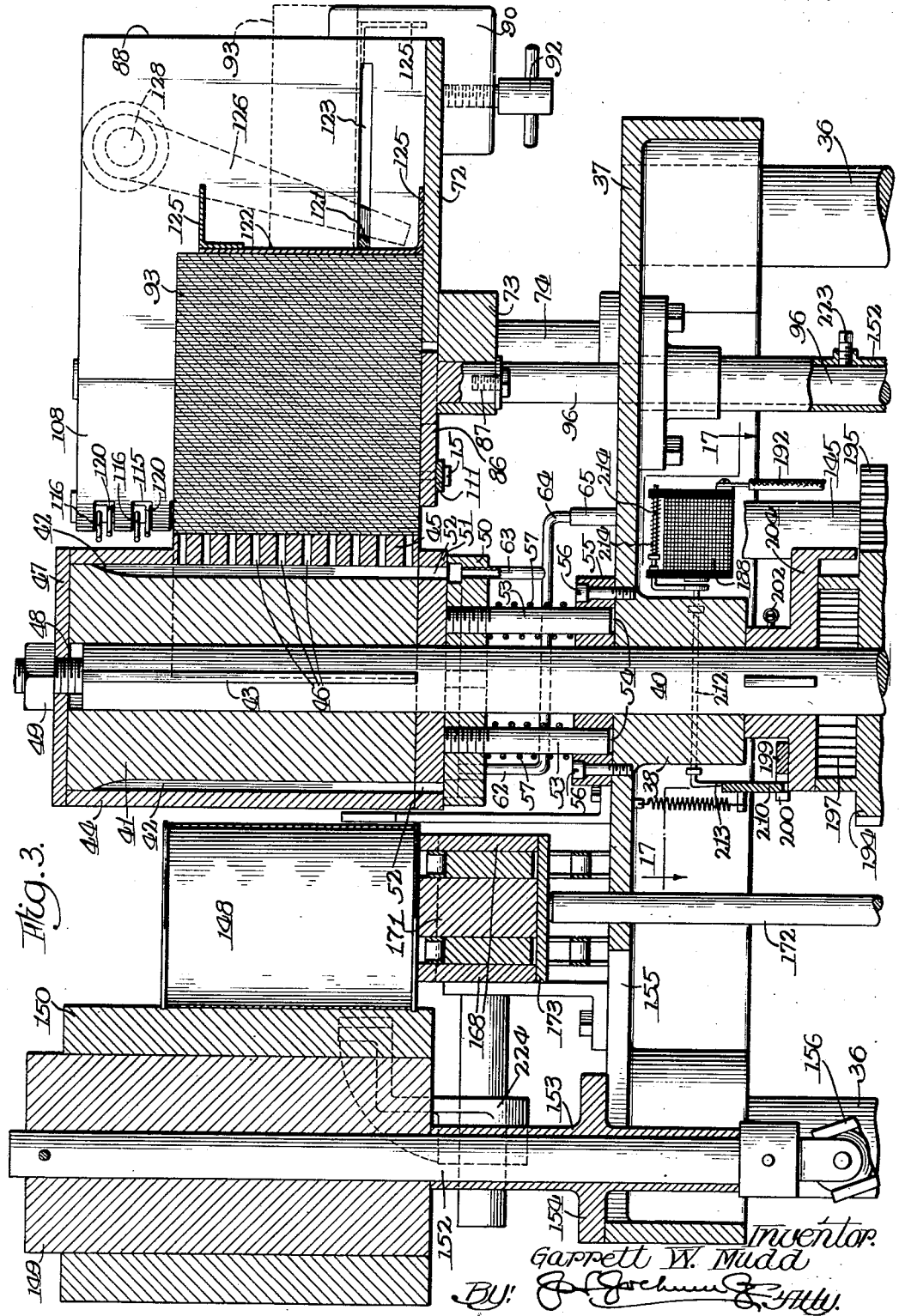

Nov. 20, 1934.  G. W. MUDD  1,981,278
LABELING MACHINE
Filed Aug. 30, 1932  11 Sheets-Sheet 4
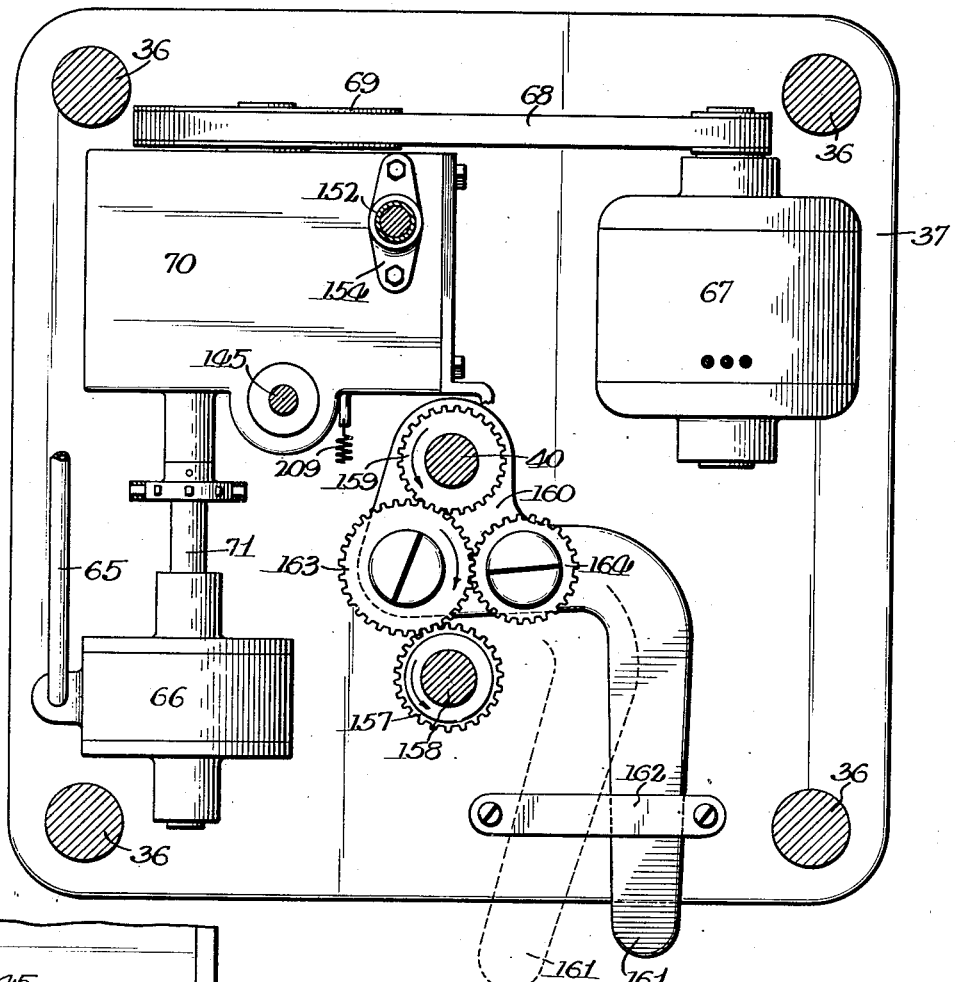
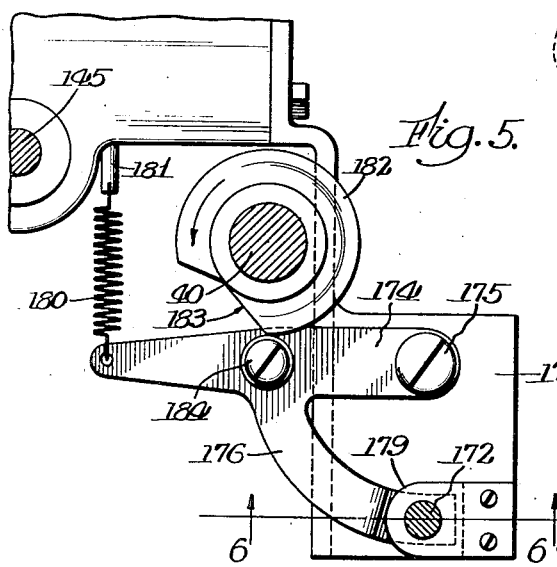
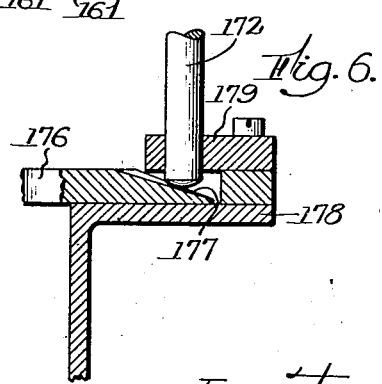
Inventor: Garrett W. Mudd Nov. 20, 1934.  G. W. MUDD  1,981,278
LABELING MACHINE
Filed Aug. 30, 1932   11 Sheets-Sheet 5

Inventor:
Garrett W. Mudd

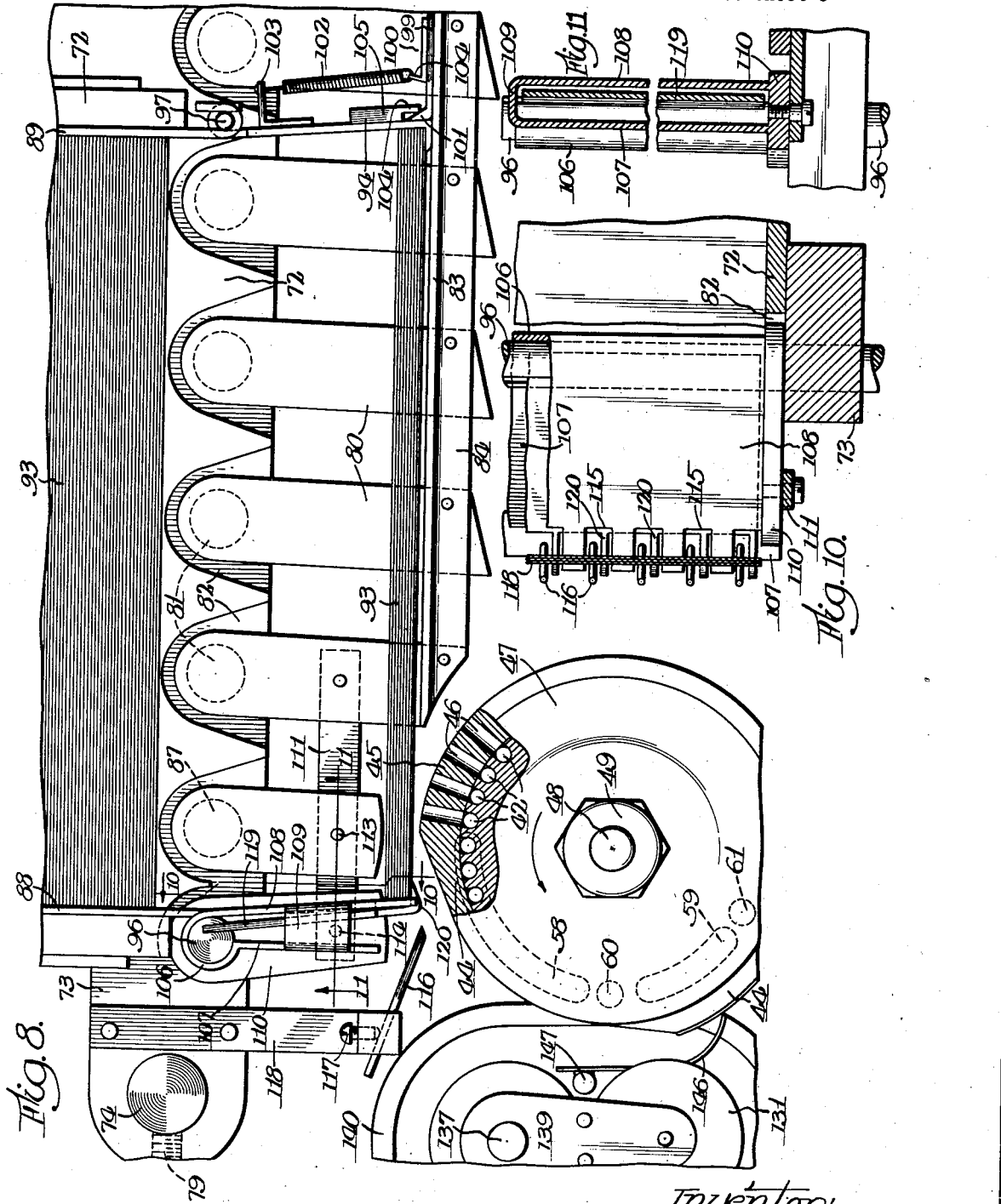

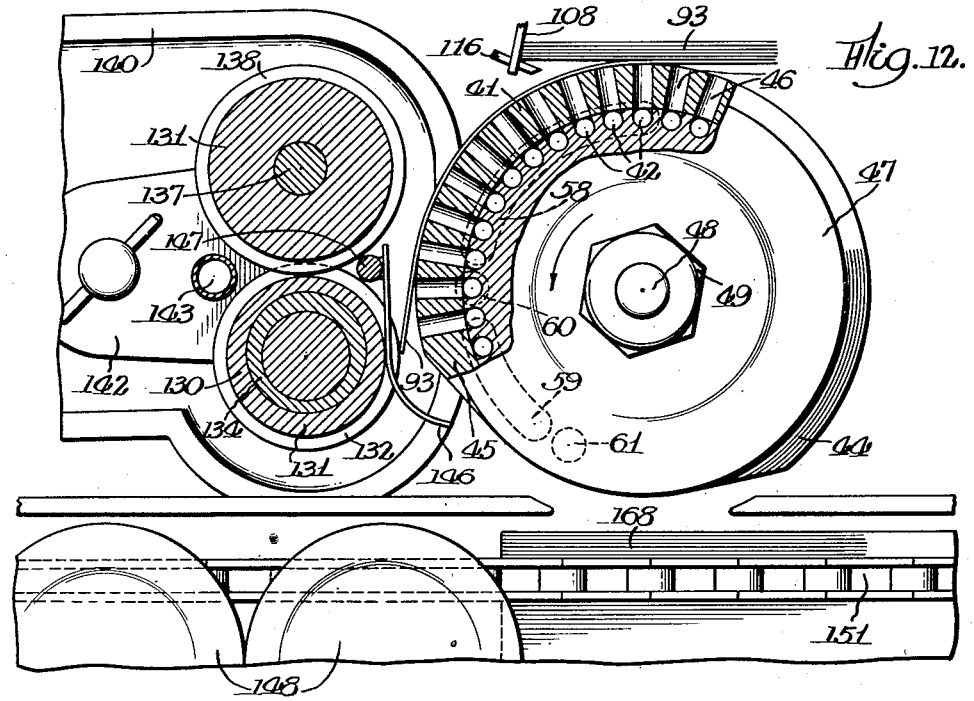
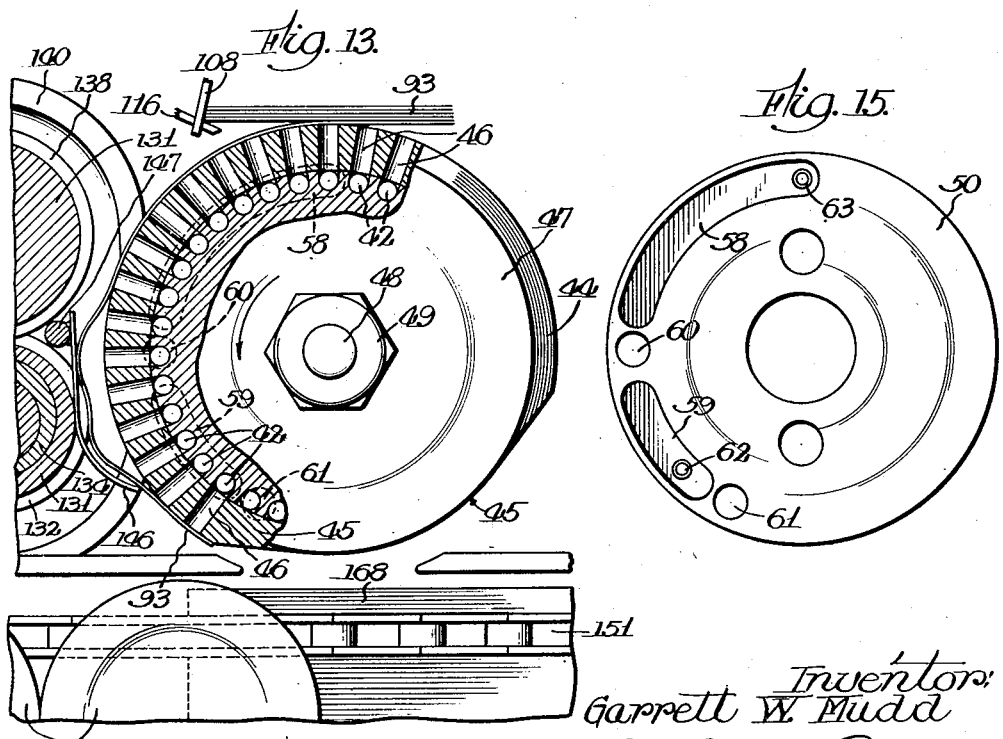

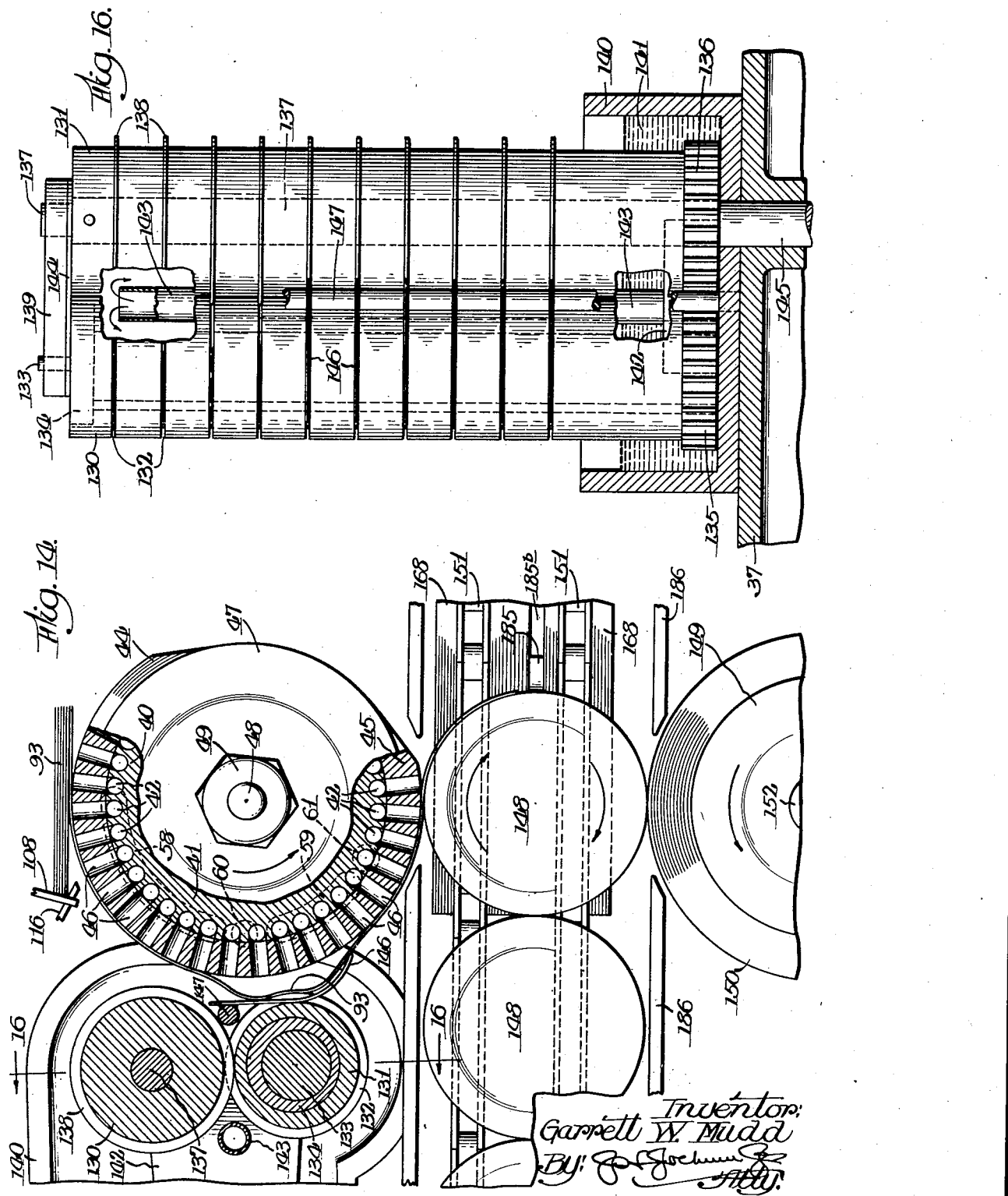

Nov. 20, 1934.  G. W. MUDD  1,981,278
LABELING MACHINE
Filed Aug. 30, 1932   11 Sheets-Sheet 9

Inventor:
Garrett W. Mudd
By: [signature] Atty.

Nov. 20, 1934.  G. W. MUDD  1,981,278
LABELING MACHINE
Filed Aug. 30, 1932  11 Sheets-Sheet 10

Inventor:
Garrett W. Mudd
BY
Atty.

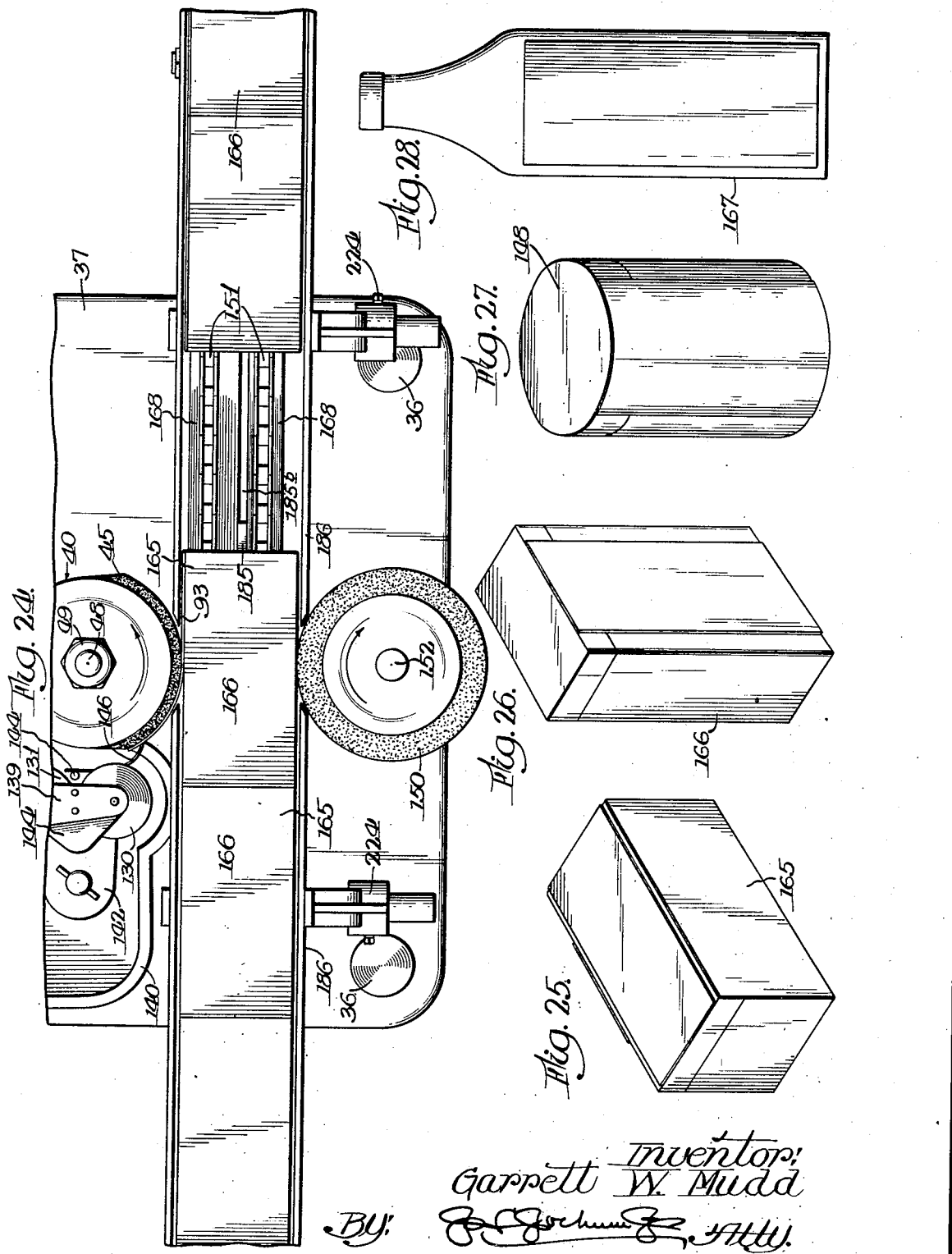

Patented Nov. 20, 1934

1,981,278

UNITED STATES PATENT OFFICE 1,981,278

LABELING MACHINE

Garrett W. Mudd, Chicago, Ill., assignor to Pneumatic Scale Corporation, Ltd., Quincy, Mass., a corporation of Massachusetts Application August 30, 1932, Serial No. 631,071

14 Claims. (Cl. 216—54)

This invention relates to improvements in machines for applying labels to packages or containers, and in which machine the labels are successively removed from a supply of labels by means of suction and conveyed and applied to the containers as the latter are advanced, and one of the objects of the invention is to provide an improved machine of this character in which the labels in the supply are arranged or stood uprightly upon one edge thereof, and applied to the container while the latter is in an upright position, with the result that the labels may be applied or attached to the containers before the latter are closed or sealed.

A further object is to provide in a machine of this character, wherein a suction drum grasps the foremost label and removes the same from a supply of labels, improved means for causing a plurality of labels constituting the forward portion of the supply to bodily move transversely with respect to the remaining portion of the supply, thereby assisting the drum in removing the label from the supply.

A further object is to provide improved means for causing the suction drum to successively release portions of the label removed from the supply to permit the label to contact with a paste applying member, and then cause the portions of the label to which the paste has been applied, to be again drawn against and held by the drum until the label is conveyed to the article and subsequently released from the drum to be applied thereto.

A further object is to provide improved means whereby the machine may be adapted to apply labels to either round containers or to the surface of what is known as flat containers, which are angular in cross section.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which Figure 1 is a top plan view of a machine of this character constructed in accordance with the principles of this invention.

Figure 2 is a right hand end elevation taken on line 2—2, Figure 1, with parts broken away.

Figure 3 is a detail vertical sectional view taken on the line 3—3, Figure 1, on an enlarged scale.

Figure 4 is an irregular, horizontal sectional view taken on the line 4—4, Figure 2.

Figure 5 is a detail sectional view, taken on line 5—5, Figure 2.

Figure 6 is a detail sectional view taken on line 6—6, Figure 5.

Figure 8 is a view similar to Figure 7, showing a greater portion of the label container and with the parts in a position different from the position shown in Figure 7.

Figure 10 is a detail sectional view taken on line 10—10, Figure 8.

Figure 11 is a vertical sectional view taken on line 11—11, Figure 8.

Figure 12 is a view partly in top plan, partly in horizontal section and partly broken away, showing the suction creating drum and the paste applying rollers.

Figure 13 is a view similar to Figure 12, showing the parts in a different position.

Figure 14 is a view similar to Figure 12, showing the parts in another position.

Figure 15 is a sectional view taken on line 15—15, Figure 3.

Figure 16 is a view taken on line 16—16, Figure 14, and with parts broken away.

Figure 24 is a top plan view of a portion of the mechanism showing the same adapted to apply a label to a flat container.

Figures 25, 26, 27 and 28 are views of various articles having labels applied thereto.

Figure 1:
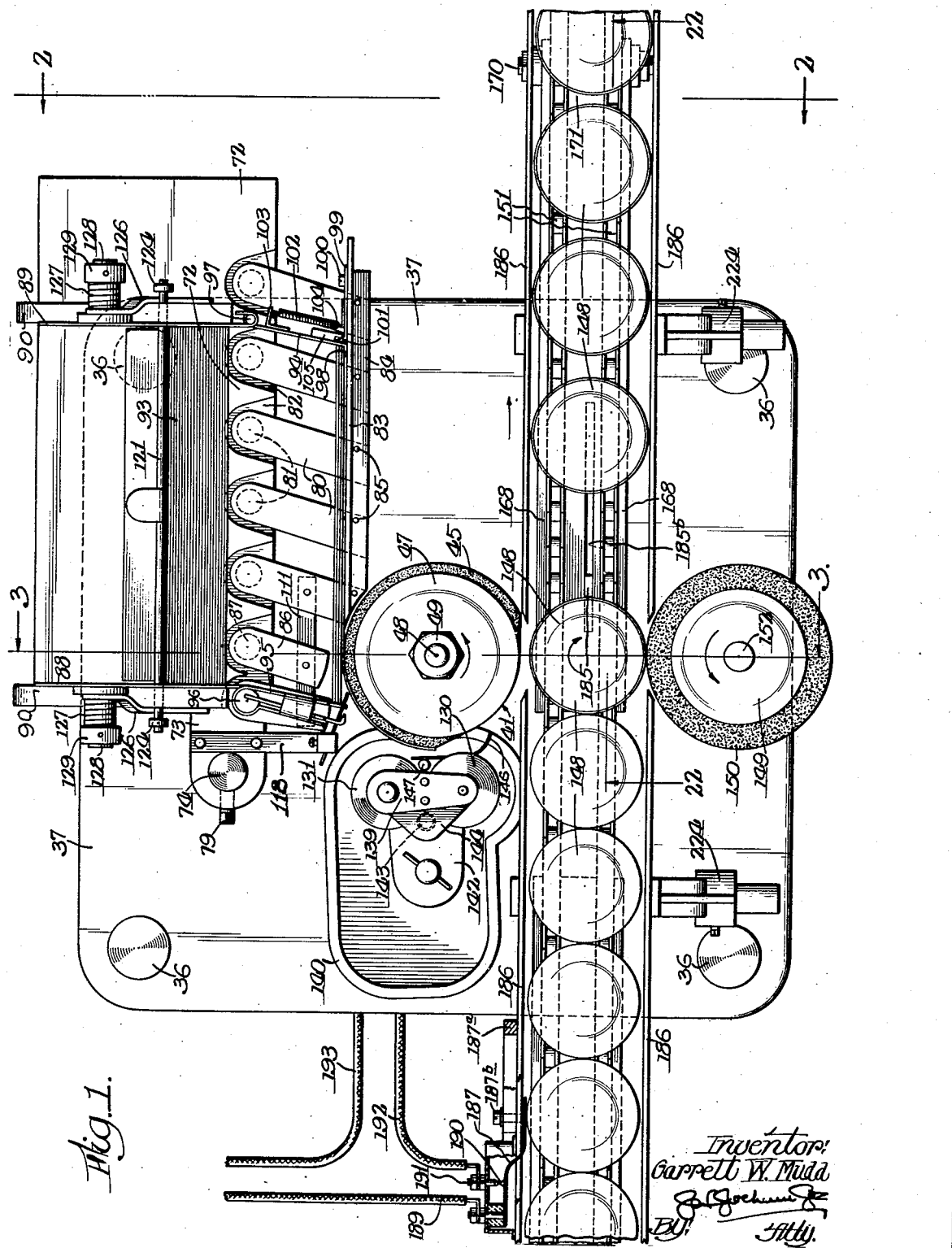

Referring more particularly to the drawings the numeral 35 designates a suitable platform mounted upon suitable supports 36 which preferably pass therethrough for any desired distance thereabove, and arranged at the top of the supports 36 is another platform 37.

Journaled in suitable bearings 38—39 is an upright shaft 40 which projects for any desired distance above the platform 37 which shaft has secured thereto for rotation therewith a drum 41 provided with passages or channels 42 extending lengthwise thereof and opening through the periphery of the drum, any number of which passages 42 may be provided, and the said passages may be of any desired diameter.

The drum is secured to the shaft 40 for rotation therewith in any suitable manner such as by means of a key 43, and encompassing the drum is a sleeve 44 having an enlarged or thickened portion 45 and radial openings 46 extend through the thickened portion 45. These openings 46 are arranged in alinement with certain of the passages 42 to form communication therewith and the passages 46 open through the periphery of the thickened portion 45 of the sleeve. A cap plate 47 is provided with an opening at its center through which a threaded extremity 48 of the shaft 43 loosely passes, and a nut 49 is threaded upon the portion 48 of the shaft and serves to force the cap plate 47 against the end of the drum 41, and as the diameter of the cap plate is greater than the diameter of the drum, a portion of the cap plate will extend over and engage the upper edge of the sleeve 44 and thereby hold the sleeve in position.

Arranged beneath the drum 41 is a member 50 which rests against a supporting plate 51 held against the lower end of the drum 41, and which plate 51 is provided with openings 52 therethrough to register with the openings 42 in the drum. The member 50 is held stationary by means of bolts 53 which are secured to the member 50 by one end, the other ends thereof passing into openings 54 in a member 55, through which the shaft loosely passes and this member 55 is secured in position preferably to the platform or support 37 by means of fastening bolts 56 which are threaded into the support 37. Springs 57 encompass the bolts 53, one end of the springs resting against the member 50 while the other ends rest against the member 55. The member 50 is provided with grooves or channels 58—59 separated from each other and opening through one face of the member. The proximate ends of these grooves 58 terminate considerably short of each other to provide a space through which an opening 60 passes constituting an exhaust outlet, and a similar outlet opening 61 is also provided through the member 50.

A pipe 62 leads from one of the openings 60—61 and a pipe 63 leads from the other opening. A pipe 64 connects the pipes 62 and 63 and this pipe 64 is in turn connected by means of a tubular member 65 which may, if desired, be of flexible material and through which pipe suction will be created by means of the suction creating pump 66 for causing a suction through the openings 46, passages 51—52 in the drum 41 and thence into the pipe 64, for a purpose to be hereinafter set forth. The pump 66 is preferably operated by means of a motor 67 through the medium of a driving belt 68 connected to a pulley 69, which through the medium of gear mechanism in a gear box 70, rotates the shaft 71 of the pump 66.

Arranged adjacent the suction drum 41 is a hopper or container for holding the labels, and this hopper comprises a main bottom portion 72 which is held stationary and for adjustment in a vertical plane. To that end there is provided a bar 73 secured to the lower face thereof and projecting beyond the sides of the hopper. An upright 74 is mounted upon the platform 37 and passes loosely through a projecting portion of the bar 73 at one end thereof. The other end of the bar is supported in any suitable manner (see particularly Figure 2), such as by means of an upright 75 having a slot 76 therein and through which slot a fastening bolt 77 passes and is threaded into the platform or support 37. The support 75 may be secured to the bar 73 by means of a fastening bolt 78. A screw or bolt 79 also passes through a portion of the bar 73 and engages the upright or standard 74. By loosening the bolts 77 and 79 it will be manifest that the hopper may be adjusted vertically to any desired extent, and for a purpose to be later set forth.

The remaining portion of the bottom of the hopper is preferably formed by means of members 80 which are pivotally mounted to swing about upright pivots 81 (see particularly Figure 3) and the pivoted ends of the members 80 are preferably seated within recesses 82 in the stationary portion 72 of the bottom of the hopper. These members 80 may be of any desired length and are preferably laterally spaced from each other a sufficient distance so as to allow them to swing freely about their pivots 81 with respect to the bottom 72, for a purpose to be set forth.

The forward ends of the members 80 are preferably connected by means of an upright 83 having a flange 84 at the bottom thereof and which upright constitutes the front of the hopper against which the forward label rests to form a support for the labels. The flange extends across and is connected with the members 80 by means of pivot pins 85 so as to permit the members 80 to be swung about their pivots 81. The upright 83 and flange 84 terminate short of the drum 41, and an additional member 86 may also be provided to swing about an upright pivot 87. The sides of the stationary portion of the container are preferably formed by uprights 88—89 which are secured in any suitable manner to the bottom 72, preferably by means of a clamping member 90 which engages under the bottom 72 as at 91, and a fastening screw or bolt 92 may be provided for securing the sides in position.

With this construction it will be manifest that the sides 88—89 may be adjusted laterally one with respect to the other to vary the width of the container according to the size of labels 93 which are used. The front portion of the sides of the container which stand adjacent the members 80 are preferably formed by uprights 94—95 which are hingedly connected to the sides 88—89 as at 96—97 and the member 94 is provided with a flange 98 which rests against the upright 83. A member 99 is secured as at 100 to the upright 83 and is provided with a laterally projecting portion 101 adapted to contact with the outer face of the member 84 and to extend substantially the entire length thereof, as shown more clearly in Figure 2. A spring 102 is anchored by one end as at 103 to the member 94 and by the other end as at 104 to the member 99 and tends normally to hold a shoulder on a member 105 (see particularly Figure 8) which is secured to the member 94 against the portion 101 of the member 99 so as to form a yielding joint between the member 94 and the upright 83, thereby not interfering with the swinging movement of the members 80 about their pivots 81.

The member 99 is adjustably secured to the upright 83 so that when the sides 89—94 are moved toward the opposite side of the container, the member 99 may be correspondingly adjusted.

The pivot 96 is preferably formed by means of an upright shaft and a substantially U shaped member 106 extends about this shaft. This member 106 is provided with spaced portions 107—108 which are spaced from each other and are secured together by means of a connecting portion 109 at the top thereof. The portions 107—108 are substantially equal to the height of the container and are mounted upon a swinging support 110, and which support 110 together with the member 86 are connected to one of the members 80 by means of a bar or member 111 through the medium of pivots 112, 113 and 114 so that when the members 80 are swung about their pivots the member 86 together with the support 110 as well as the members 107—108 will be correspondingly swung about their pivots.

The member 108 (see particularly Figure 3) preferably projects beyond the front edge of the member 107 and is provided with cut away portions 115 to receive stationary fingers 116 which are adjustably secured by means of fastening screws 117 to a member 118 constituting an arm or bracket, which in turn is mounted upon the projecting portion of the bar or member 73.

Carried by the upright shaft 96 and disposed between the members 107 and 108 and oscillatable erally projecting lips or fingers 120 at the forward therewith is an upright member 119 having lateredge thereof, and which lips or fingers are adapted to project into the cut away portions 115 in the member 108 to engage over the adjacent edge of the labels 93 and to be moved backwardly away from such edge so as to allow the edges to contact with the fingers 116 to be supported thereby, and such fingers will hold up such edges to permit the fingers 120 to move back over the edge of the labels. The fingers 120 will move back to release the labels to allow the foremost label to be grasped by the suction drum 41.

The normal position of the parts of the hopper adjacent the drum 40 is shown in Figure 8, that is with the fingers 120 engaging over the proximate edge of the labels 93 and the edges of the label abutting the member 108. Upon the first movement of the forward portion of the hopper from the position shown in Figure 8, the fingers 120 will be moved out of engagement with the edge of the labels 93 and into the position shown in Figure 9, which will allow the foremost label to be drawn against the surface of the suction drum 41 by the suction therein, while the edges of the remaining labels contact with the member 108. During this portion of the operation the parts will assume the position shown in Figure 9, and at the time that the drum 41 is rotating in the direction indicated by the arrow in Figure 9, with a portion of the outermost label held in contact with the periphery thereof, the shaft 96 through the medium of the member 119 will cause the support 110 to swing about its pivot by reason of the member 119 contacting with the member 107, swinging the members 107 and 108 about their pivot and through the medium of the connecting member 111 causing the members 86 and 80 to swing about their respective pivots 87—81 to shift the movable part of the container with respect to the stationary part 72. This movement causes the movable part of the container to travel a short distance with the foremost label 93 and with the drum 41, thereby assisting and insuring the removal of the label from the supply.

Figure 7:
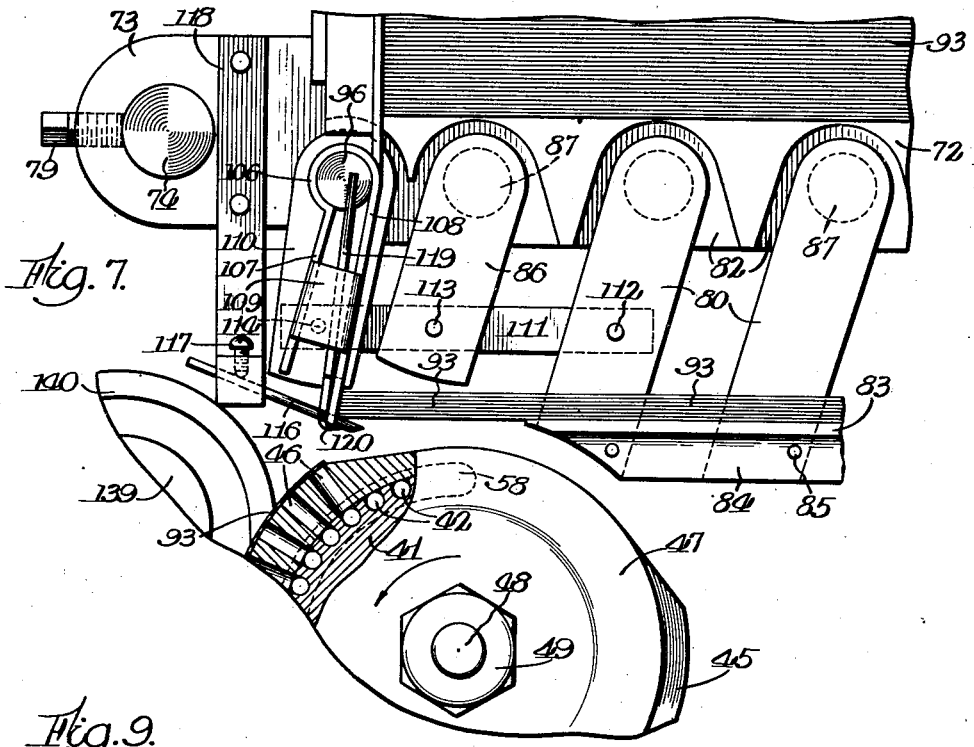
Figure 7 is a detail view, partly in plan, partly broken away and with parts omitted, showing a portion of the suction drum and a portion of the label holding container.
Figure 9:
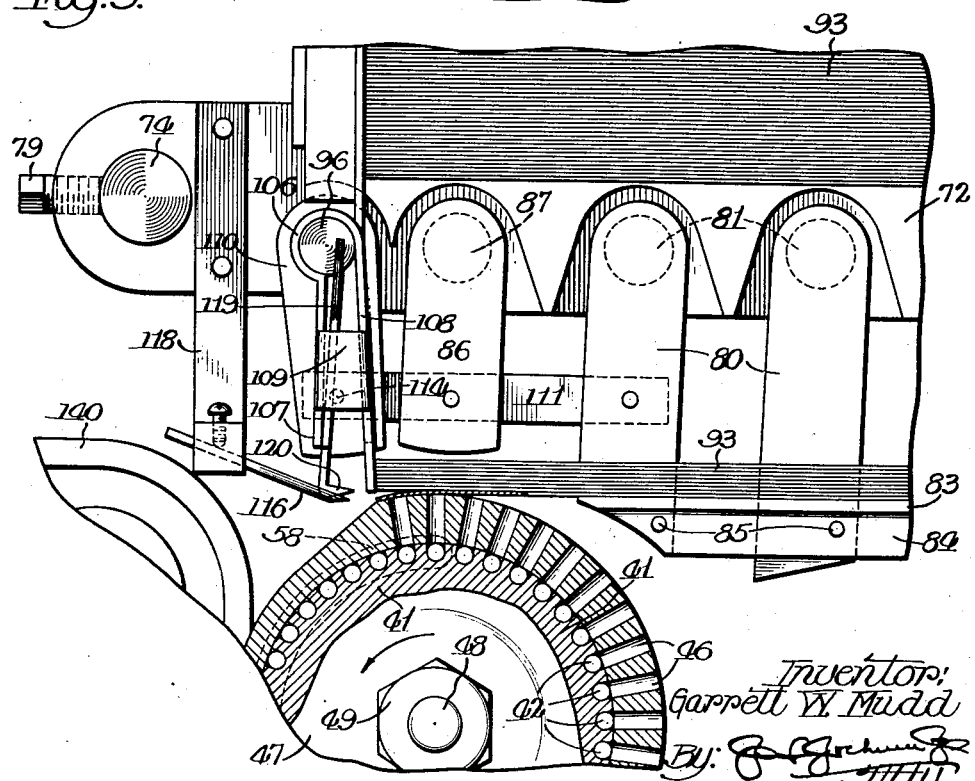
Figure 9 is a view similar to Figure 7 with the parts in another position.

When the motion of the shaft 96 is reversed, the member 119 will engage the member 108 and move the parts from the position shown in Figure 9 back to the position shown in Figure 7.

It will therefore be manifest that the front portion of the supply of labels will be bodily moved laterally with respect to the remaining portion of the labels or with respect to that portion of the labels which are contained within the stationary portion of the container.

The labels may be urged forwardly in the container and against the upright member 83 in any desired or suitable manner such as by means of a bar or rod 121 which engages behind a follower member 122 and extends through slots 123 in the sides 88—89 of the container. This rod is held against displacement by means of collars 124 secured to the ends thereof and the follower 122 may be provided with laterally projecting flanges 125 at the top and bottom thereof.

Pivotally mounted on the sides 88—89 are arms 126 which engage behind the bar or rod 121 on the outside of the container and preferably adjacent the walls thereof. Springs 127 are provided and surround the supports 128, one end of the springs being anchored to the supports preferably by means of a collar 129, and the other end of the springs engage behind or are connected to the respective arms 126 and tend normally to hold the arms 126 behind and against the rod 121 and force the latter forwardly against the supply of labels and at the same time force the supply forwardly against the upright member 83.

When the relative movement of the container is varied obviously a longer or shorter rod 121 may be employed and the nuts or collars 124 removed so as to permit the removal of the rod through the slots 123.

The follower 122 (see particularly Figure 3) is adapted to be moved from the position in said figure to the position shown in dotted lines, when it is desired to add another quantity of labels. This is accomplished, assuming that the supply of labels is depleted, by swinging the follower about the rod 121 as a pivot or into the dotted line position, after which an additional supply of labels 93 may be placed upon the follower when in the dotted line position, and the follower swung upwardly about the rod 121 into the full line position shown in Figure 3.

With the present construction it will be manifest that should it be desired to employ wider labels, the sleeve 44 having the projecting circumferential portion and the openings 46 through which suction is created, may be removed by removing the plate 47 and another sleeve applied to the drum which will accommodate wider labels, and by adjusting the container vertically in the manner already set forth, the position of the labels with respect to the drum 41, in directions lengthwise of the axis of the latter, may be varied.

After the label has been removed from the container it is carried to a paste applying device (see particularly Figures 1 and 12 to 16), which consists of upright rollers 130—131, the roller 130 being preferably provided with a plurality of peripheral grooves 132 spaced from each other in directions lengthwise of the axis of the roller and which is mounted upon its operating shaft 133 by an eccentric 134, the shaft 133 being positively driven by means of a gear 135 that meshes with a gear 136 secured to a shaft 137 upon which the roller 131 is mounted. The roller 131 is preferably provided with circumferential projecting ribs 138 adapted to enter portions of the grooves 132 of the rollers 130 and the shafts 133—137 may be journaled at their upper ends in a suitable bearing 139.

The lower ends of the rollers 130—131 are arranged within a tank 140 which holds the paste 141 and the paste is forced by the rotation of the gears 135—136 which mesh with each other, into a chamber 142 constituting what might be termed a pump chamber. Leading from this chamber 142 is an upright pipe 143 which stands adjacent and intermediate the rollers 130—131, terminating adjacent the top thereof so that when the paste is forced through the pipe 143 to be preferably discharged from the top thereof, the paste will be applied to the rollers 130—131.

A splash plate 144 is arranged above and spaced from the end of the pipe 143.

The gear 136 is secured to and for rotation with a shaft 145 which in turn is rotated by suitable gearing within the gear box 70 (see particularly Figures 2, 4 and 16). Stripper fingers 146 are provided for removing the label from the paste roller 131 and these fingers 146 are secured to an upright shaft 147 arranged between portions of the rollers 130—131. These fingers extend into the grooves 132 in the rollers 131 as shown more clearly in Figures 9, 12 and 15, and may be of any desired length and configuration.

When the parts are in the position shown in Figure 9, the passages 42 of the drum 41 will be in communication with the suction groove 58 in the member 50, and the forward end of the label will be drawn against the drum, as shown in Figure 9. As the drum rotates, drawing the label from the supply, the passages 42 will remain in communication with the groove 58 until the foremost passage 42 passes into communication with the exhaust passage 60 (see Figure 15). This will release the adjacent portion of the label and the label will then assume the position shown in Figure 12, that is the forward edge thereof will be released from the drum and it will move outwardly into contact with the paste applying roller 131. As the drum further rotates the passage 42 which has been in communication with the exhaust passage 60, will then pass into communication with the groove 59, thereby re-establishing the suction upon the portion of the label to which paste has been applied, which will draw that portion of the label back again into contact with the drum, as shown in Figures 13 and 14. As the label passes into contact with the drum 131, the stripper fingers 146 will assist in removing that portion of the label from the paste applying drum and direct it back against the periphery of the suction drum. Just after the parts assume the position shown in Figure 13, the foremost passage 42 of the drum will again pass into communication with the exhaust passage 61 just about the time that the label reaches the container to be applied thereto, which will release the label and allow it to be moved into contact with the surface of the container.

Thus it will be seen that with this improved construction the label will be removed from the supply by suction through the suction drum. As the foremost portion thereof will be released it will move into contact with the paste applying drum to receive the paste and will then be drawn back against the suction drum and held for a further portion of the rotation of the drum, then again released so that it can be applied to the container and, as the container is rotated or advanced, the suction drum will assist in applying the label to the container. This is accomplished by reason of the fact that the container 148 (see particularly Figures 1 and 14) passes between the suction drum 41 and a rotatable drum 149, which latter is preferably provided with a resilient or rubber covered surface 150. The enlarged portion 44 of the suction drum is of sufficient extent circumferentially of the drum so as to hold the label in contact with the container for the entire extent of the label, and in order to permit the container 148 with the label attached thereto to pass between the drum 41 and the drum 149, the diameter of the sleeve 44 on the drum 41 is reduced.

The containers are fed into the machine preferably by means of a conveyor 151, which receives its motion from any suitable source (not shown), and the drum 149 is connected to a shaft 152 journaled in a suitable bearing 153 (see particularly Figures 2 and 3). This bearing 153 is preferably provided with a flanged portion 154 and passes through a slot 155 in the support 57, so as to permit the shaft 152 and the roller 149 to be adjusted toward and away from the suction roller 41 to compensate containers of different diameters. The shaft 152 is driven by means of a universal coupling 156 from a gear 157 secured to a shaft 158 and the gear 157 is driven from a gear 159 (see Figure 4) on the shaft 40. In order to control the direction of rotation of the shaft 158 and therefore the shaft 152, there is provided a pivotally mounted support 160 (see Figure 4) having an operating handle 161 which is movable in a guide 162. Rotatably mounted upon this support 160 is a gear 163 which meshes with a gear 164 rotatably mounted upon the support 160.

The gear 163 is adapted to be moved into mesh with the gears 157 and 159 (see Figure 4) so as to cause the shaft 152 to rotate in the direction indicated by the arrow shown in Figure 1. When, however, it is desired to rotate the shaft 152 (see particularly Figure 24) in the direction indicated by the arrow in said figure, the support 160 is swung about its pivot to move the gear 163 out of mesh with the gear 157 and move the gear 164 into mesh with the gear 157 so that the gear 157 will mesh with the gear 164, the gear 164 meshing with the gear 163 and the gear 163 in turn meshing with the gear 159.

When containers 148 similar to the one shown in Figure 27, are to be labeled and the label applied to the curved surface of the container, the parts will be in the position shown in Figure 4, so as to cause the container to rotate upon the conveyor, but when it is desired to apply the labels to the flat surfaces of containers 165, 166 and 167, or which containers are angular in cross section as shown more particularly in Figures 25, 26 and 28, it is not necessary to rotate the containers and therefore the gears for controlling the rotation of the shaft 152 will be shifted from the full line position shown in Figure 4 to the position indicated partially in dotted lines in said figure, and in that event the roller 150 on the shaft 152 will assist in advancing the container with the conveyor.

At the point in the cycle of operation of the machine where the label is applied to the container, it is necessary, in the form of the invention shown in Figure 1, to arrest the advancing movement of the container with the conveyor 151 so that the container may be rotated and the label properly applied.

To that end any means may be provided which will be automatically rendered active and inactive so as to arrest the bodily advancement of the container and at the same time be adapted to be rendered inactive to permit the labeled container to be advanced with the conveyor without arresting the movement of the conveyor.

Figure 22:
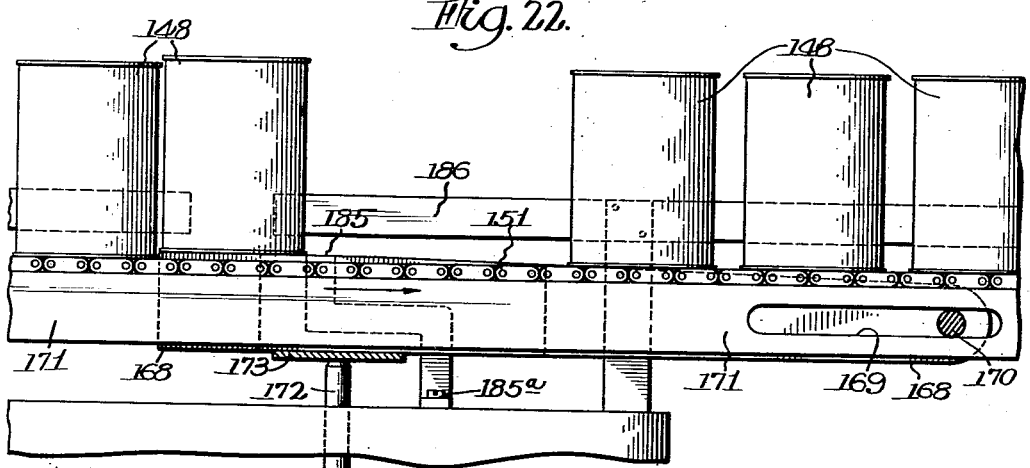
Figure 22 is a view taken on line 22—22, Figure 1.
Figure 23:
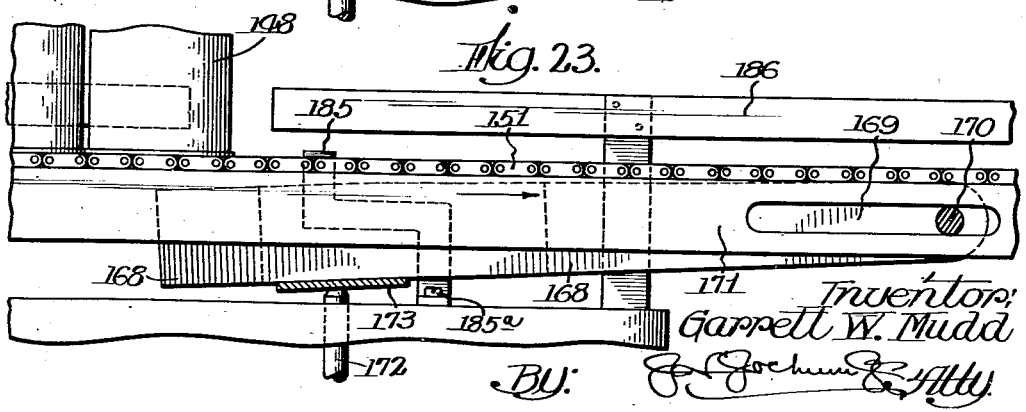
Figure 23 is a view similar to Figure 22 showing the parts in another position.

A simple and efficient means embodies arms 168 (see particularly Figures 1, 2, 3, 22 and 23) which may be arranged to extend for any desired distance lengthwise of and adjacent the run of the conveyor 151. The arms 168 are provided with pins 170 passing through slots 169 in a suitable supporting structure 171. The arms 168 are of a sufficient length to permit them to be readily swung about their pivots on the bar or rod 170 and the other extremities thereof are adapted to be raised into the path of movement of the advancing containers, that is of the containers, preferably, just following the container 148 to which the label is to be applied, as shown more clearly in Figure 22. This is accomplished by raising the forward ends of the arms 168, in any suitable manner, such as by means of a pin or rod 172 (see also Figures 2, 5 and 6) that is adapted to engage a cross bar or member 173 that extends across and beneath the arms 168, preferably adjacent the forward end thereof, and raise such end when the pin or rod 172 is raised. Any suitable means may be provided for intermittently raising and lowering the pin or rod 172. A simple and efficient means embodies a member 174 (see particularly Figure 5) which is pivotally supported as at 175 and is provided with an arm 176 having a cam surface or portion 177 that is adapted to pass between the support 178 for the member 174 and a guide 179 through which the pin 172 passes. The cam or inclined surface 177 passing beneath the pin 172 will force the latter upwardly when the member 174 is swung about its pivot 175 in one direction, thereby effecting the raising of the forward ends of the arms 168. As the member 174 is swung in the opposite direction about its pivot 175, preferably by means of a spring 180, one end of which is anchored to a fixed support as at 181 and the other end of which is connected to a portion of the member 174, the pin 172 as well as the forward ends of the arms 168 will be lowered and the container which has been arrested in its movement by the ends of the arms 168, will be released to permit the container to again advance, after which the arms 168 will be again raised.

The member 174 is swung about its pivot against the stress of the spring 180 to force the cam or beveled portion 177 of the member 174 under the pin 172, preferably by the operation of the shaft 40, to which latter is secured a cam 182 having a low portion 183. The cam engages an anti-friction roller 184 on the member 174 to accomplish this movement of the member 174, and the low portion of the cam permits the spring 180 to move the member 174 in the opposite direction.

It is desirable that when the advancing movement of the container to which the label is being applied is arrested so as to apply the label, the container should be relieved of the action of the conveyor thereupon. To accomplish this result there is provided a stop 185 which projects through a slot 185$^b$ in the supporting structure 171 and is secured in position for adjustment by means of a bolt 185$^a$. This support 185 is so arranged that when the arms 168 are elevated by the pin 172 they will engage beneath the bottom of the foremost container and will operate to slightly raise this container so that the conveyor 151 as it is being advanced, will move the foremost container 148 against the stop 185. After one container has been labeled and the arms 168 have been lowered, the advancing movement of the next container by the conveyor 151 will cause the labeled container to be partially removed from the stop 185 or into a position that a portion of the bottom of the container will contact with the conveyor 151 to be conveyed away thereby.

Guides 186 may, if desired, be arranged along the path of travel of the conveyor 151.

Means are provided for automatically arresting the operation of the suction drum 41 when the container is not properly positioned to have the label applied thereto, or when a predetermined number of containers are not in the desired position with respect to the foremost container, and at the same time cause an intermittent rotation to be imparted to the shaft 40 which carries the suction drum 41, such as an electro-responsive device which is controlled by a switch device embodying a contact member 187 (see particularly Figures 1 and 17 to 20) which controls the operation of an electro-responsive device 188 which in turn controls a clutch device adapted to connect the shaft 40 with a continuously rotating gear 194. This gear may be driven in any suitable manner, preferably by means of a gear 195 secured to the shaft 145.

The contact member 187 is preferably constructed in the form of a spring arm mounted upon a slide 187$^a$ having a slot therethrough through which a bolt 187$^b$ passes, to permit adjustment in the positioning of the switch device, and to which arm a supply conductor 189 is connected, the contact member being provided with a contact point 190 and co-operates with a contact 191 that in turn is connected to a conductor 192, which leads to the electro-responsive device 188. Another conductor 193 is also connected to the electro-responsive device 188 and constitutes the other side of the supply line. The end of the contact member 187 projects normally in the path of movement of the advancing container to move the contact 190 into engagement with the contact 191 and thereby energize the magnet of the solenoid 188 to render the clutch active and connect the gear 194 to the shaft 40, in a manner to be described. When, however, no container engages the contact member 187 the contacts 190—191 will be separated and the magnet of the solenoid 188 de-energized to permit the solenoid to render the clutch device inactive and thereby disconnect the shaft 40 with respect to the gear 194.

The clutch device may be of any desired construction which will permit the gear 194 to be locked to the shaft 40 for a sufficient length of time to impart one complete revolution to the shaft 40 and then be released to unlock the gear 194 with respect to the shaft so that the shaft 40 will stand still while the gear 194 continues to rotate. A simple and efficient clutch device (see particularly Figures 17 to 20) consists in providing a housing 196 carried by the gear 194, the inner wall of the housing being provided with open recesses 197, any number of which may be provided, and rotatably supported by the top of the housing to project thereinto is a member 198 which is preferably semi-circular in configuration. To this member 198 is connected a dog 199 having a hook shaped portion 200 at the free end thereof. To the other end 201 of the dog is connected a spring 202, which in turn is anchored to a collar or sleeve carried by the housing 196, as at 203, and tends normally to move the dog 199 in a direction to cause the member 198 to be rotated so that a portion thereof will engage within one of the recesses 197 and thereby lock the housing 196 together with the gear 194 to the shaft 40 to rotate the latter.

Figures 19, 20:
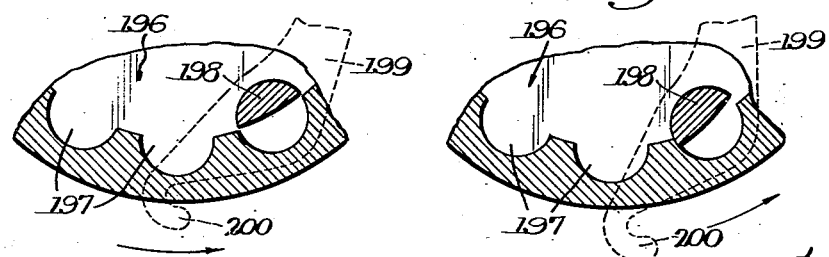
Figure 19 is a detail sectional view taken on line 19—19, Figure 18.
Figure 20 is a view similar to Figure 19, showing the parts in another position.

When, however, the dog 199 is rotated in the opposite direction to cause the member 198 to assume the position shown in Figure 19, the gear 194 will be unlocked with respect to the shaft 40.

A cam 204 is connected with the housing 196 and is provided with a low portion 205.

A rock shaft 206 is mounted in suitable bearings and is provided with a depending portion 207 to which an anti-friction roller 208 is connected and this roller is so positioned that when the cam 204 rotates it will engage the roller to rock the shaft 206 in one direction and when the low portion of the cam approaches the roller 208 a spring 209 which is connected with an arm 210, that in turn is connected with the shaft 206, will cause the latter to move in the opposite direction, the roller 208 moving in contact with the low portion of the cam so as not to interfere with such movement of the shaft 206.

When the gear 194 together with the housing 196 and the cam 204 are connected to the shaft 40, the dog 199 will be bodily rotated with the shaft, but when it is desired to release the gear 194 with respect to the shaft 40, the end of the dog 199 is engaged by the stop 211. This swings the dog about its pivot to thereby move the member 198 from the position shown in Figure 20 to the position shown in Figure 19. This is accomplished by means of a depending pin or projection 211 carried by the arm 210 and which projection 211, when the arm 210 is lowered, will assume a position within the path of the bodily movement of the hook shaped end 200 of the dog 199, and at the same time the depending portion 207 of the shaft 206 will be rocked to move the roller 208 out of engagement with the surface of the cam 204.

To the armature of the solenoid 188 is connected a member 212 (see particularly Figures 3, 17 and 18) which moves in suitable guideways and is provided with a deflected portion 213 that is adapted to be moved into the path of movement of the arm 210 and lock the same against movement under the influence of the spring 209 and when these parts are in the position as shown in Figures 3, 17, 18 and 19, the pin or projection 211 on the arm 210 will engage the end 200 of the dog 199 to cause the member 198 to be positioned as shown in Figure 19 and thereby unlock the gear 194 with respect to the shaft 40. This position will be assumed when the containers are properly positioned upon the conveyor 151 and when the parts are also in the position shown in Figure 1. Should, however, the contact member 187 be permitted to move so that the contacts 190—191 will be separated, the solenoid will operate to cause the portion 213 of the member 212 to be moved out of the path of movement of or contact with the arm 210, thereby allowing the spring 209 to raise the arm 210, rocking the shaft 206, and at the same time raising the pin or projection 211 out of active contact with the dog 199 to release the latter and thereby allow the spring 202 to rotate the member 198 from the position shown in Figure 19 to the position shown in Figure 20, to lock the gear 194 and shaft 40 together.

Figure 17:
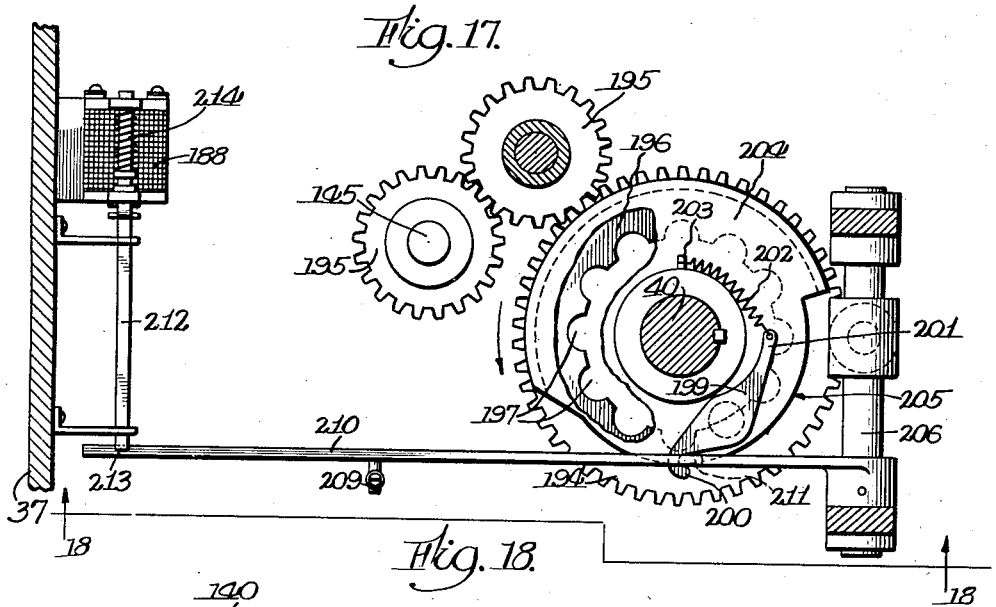
Figure 17 is an irregular sectional view taken on line 17—17, Figure 3.
Figure 18:
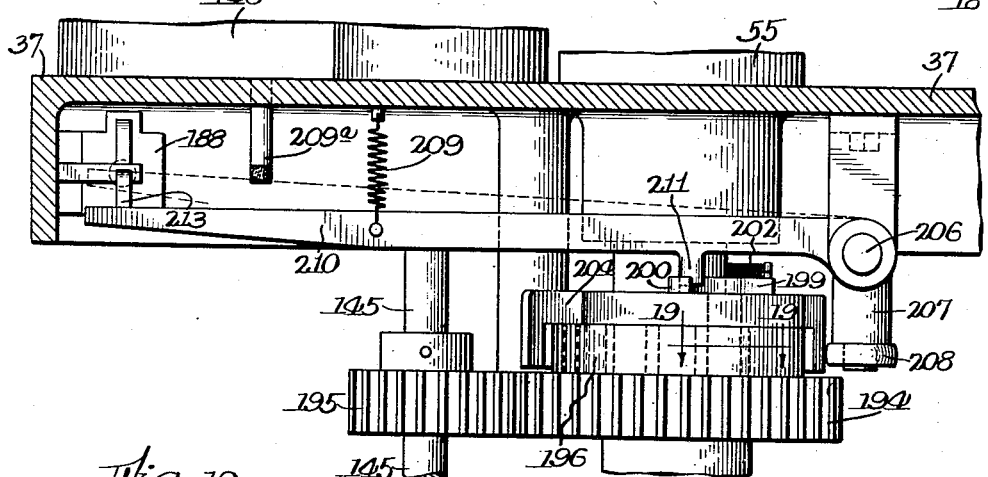
Figure 18 is a view taken on line 18—18, Figure 17.

As the shaft 40 rotates the cam 204 will rock the shaft 206 in the opposite direction to lower the arm 210 thereby causing the projection 211 on the arm 210 to intercept the end 200 of the dog 199 and cause it to again assume the position shown in Figure 19. A spring 214 operating on the armature of the solenoid will cause the arm 210 to become latched under 213 against the action of the spring 209 as shown in Figures 17 and 18.

Thus it will be seen that the clutch device will be automatic in operation and will operate each time the contacts 190—191 are made by virtue of the incoming container.

When the containers are coming along uniformly in succession it will be seen that the shaft 40 will be locked with the gear 194 continuously, and when the containers are coming along intermittently with spaces between them, the shaft 40 will be intermittently operated or intermittently locked with the gear 194 and intermittently released therefrom.

Figure 21:
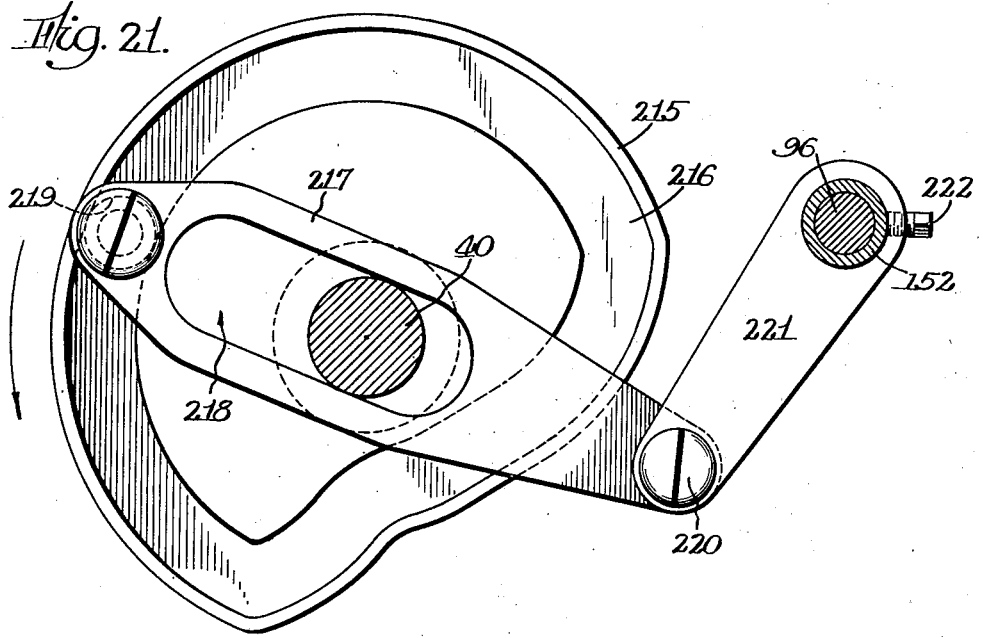
Figure 21 is a sectional view, on an enlarged scale, taken on line 21—21, Figure 2.

The shaft 96 is oscillated so as to cause the shiftable part of the container with the labels held thereby to be bodily moved with respect to the remaining portion of the container and the supply of labels to permit a portion of the labels to travel with the drum during a portion of the cycle of its operation. This intermittent motion of the shaft 96 is effected by the intermittent rotation of the shaft 40 (see particularly Figures 2 and 21) through the medium of a cam 215 provided with a cam groove 216 secured to the shaft 40 for rotation therewith. A member 217 is supported by and rests upon the cam 215, the member being provided with a slot 218 through which the shaft 40 passes. Carried by the member 217 is an anti-friction roller 219 which travels in the cam groove 216 and connected to the member 217 preferably by means of a pivot 220, is an arm 221 through which the tubular shaft 152 passes, the arm being secured to this shaft by means of a fastening screw 222. The shaft 96 which constitutes the pintle of the hinge between the sides 88 and 95 of the container telescopes into the tubular shaft 152 and the two are secured together by means of a fastening screw 223, the latter being loosened so as not to interfere with the vertical adjustment of the container, when such adjustment is desired.

Thus it will be seen that each time the shaft 40 is rotated, the forward portion of the container will be oscillated.

Obviously, the guides 186 (see particularly Figure 1) may be adjusted with respect to each other to accommodate containers of different widths or diameters in any suitable manner such as by means of adjusting mechanism 224.

It is thought that the operation of this mechanism will be clearly understood from the foregoing description, but briefly stated it is as follows. After the mechanism has been adjusted to cause the shaft 152 (Figure 1) to rotate in the desired direction, according to the nature of the container to be labeled, and which adjustment is attained through the mechanism shown in Figure 4, and assuming the container to be full of labels 93, and the proper number of containers 148 positioned upon the conveyor 151, so as to cause the contacts 190—191 to be closed and the solenoid rendered active to lock the gear 194 with respect to the shaft 40, and the machine in operation, the containers will be advanced by the conveyor 151.

When the first container 148 is in position between the drum 41 and the roller 149, and the drum 41 is rotating, suction will be created through the drum to draw the front edge of the foremost label against the drum and hold the same by suction. As the drum 41 continues to rotate the label will be drawn from the supply and at the same time the forward part of the container with a substantial supply of labels therein will be bodily moved with relation to the remaining portion of the container and the remaining portion of the supply of labels so as to cause that portion of the container to travel with the drum during the desired time in the cycle of rotation of the drum, thereby not only assisting the drum in removing the label from the supply, but insuring a proper hold upon the label by the drum. The shaft 152 being rotated, the roller 150 will rotate and this will rotate the container 148. As the label is advanced by the drum 41 it will be moved into contact with the paste applying roller 131 and as the forward end of the label approaches the paste applying roller the suction on that portion of the label will be relieved and the front end of the label will assume the position shown in Figure 12. That is, it will move against the paste applying roller to receive a supply of paste and will be stripped from the roller and directed back towards the surface of the drum by means of the stripper fingers 146.

During this cycle of rotation of the drum suction will be relieved and re-established therethrough by means of the member 50, shown more clearly in Figure 15, so as to cause the label to again adhere to the drum during its further advancement. The pasted portion of the label will then contact with the container 148, and as the drum 41 continues to rotate and as the roller 150 will rotate the container, it will be manifest that the label will be applied to the container as the latter is rotated and as these parts operate about upright axes it is not necessary to close or seal the container before the label is applied thereto.

When one of the containers assumes a position to have the label applied thereto, the remaining containers will be arrested in their advancement by the conveyor through the medium of the arms 168, the ends of which will be moved into the path of advancing movement of the next container and hold the same from being advanced by the conveyor.

As these arms are moved into the arresting position the foremost container of the supply will be raised by the arms so as to cause the container to rest upon a stationary support, with the result that it will be lifted, or moved out of contact with the conveyor for a short period of time, to prevent its advancement with the container and permit its being rotated during the application of the label.

When the arms are lowered the next advancing container will contact with the container to which the label has been applied and move the latter forwardly a sufficient distance so that it will again be picked up by the conveyor to be conveyed away.

With this improved construction it will be manifest that the labels will be supported uprightly and on one edge, and the parts may be adjusted so as to compensate labels of different sizes.

The operation of the suction creating drum will be intermittent so that the drum will remain idle while the containers are being advanced to the position to have the label applied thereto and while they are being removed from such position. This automatic rotation of the drum is controlled by the containers themselves through the medium of an electro-responsive device which in turn controls or renders active and inactive what might be termed a one revolution clutch through the medium of which the main driving shaft of the machine is connected to a continuously operating power driven member.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a container labeling machine, a magazine for holding a supply of labels, a rotatable drum, means for creating suction through the periphery of the drum to remove the labels from the supply, a roller spaced from the drum and between which drum and roller the container is fed, means for advancing the container, means for rotating the drum, means for rotating the roller, and means operating automatically to arrest the feeding movement of the container by the said feeding means.

2. In a container labeling machine, a magazine for holding a supply of labels, a rotatable drum, means for creating suction through the periphery of the drum to remove the labels from the supply, a roller spaced from the drum and between which drum and roller the container is fed, means for advancing the container, means for rotating the drum, means for rotating the roller, and means for controlling at will the direction of rotation of said roller with respect to the direction of rotation of said drum.

3. In a container labeling machine, a magazine for holding a supply of labels, a rotatable drum, means for creating suction through the periphery of the drum to remove the labels from the supply, a roller spaced from the drum and between which drum and roller the container is fed, means for advancing the container, means for rotating the drum, means for rotating the roller, a stop device, and means operating automatically to position the stop device in the path of movement of the container with the said advancing means to arrest the advancing movement of the container, the last said means also operating to remove said stop device.

4. In a container labeling machine, a magazine for holding a supply of labels, a rotatable drum, means for creating suction through the periphery of the drum to remove the labels from the supply, a roller spaced from the drum and between which drum and roller the container is fed, means for advancing the container, means for rotating the drum, means for rotating the roller, a stop device, means operating automatically to position the stop device in the path of movement of the container with the said advancing means to arrest such movement, and means for holding the container out of contact with the advancing means as the feeding movement of the container is arrested.

5. In a container labeling machine, a magazine for holding a supply of labels uprightly on one edge, a drum rotatable about an upright axis, means for creating suction through the periphery of the drum for successively removing the labels from the supply, a paste applying roller rotatable about an upright axis, means for supplying paste to the roller, and means for controlling the suction through the periphery of said drum whereby the label will be held against the drum, released to permit contact thereof with the paste roller and then drawn against the drum and held so as to be advanced to the container to which it is to be applied.

6. In a container labeling machine, a magazine for holding a supply of labels uprightly on one edge, a drum rotatable about an upright axis, means for creating suction through the periphery of the drum for successively removing the labels from the supply, a paste applying roller rotatable about an upright axis, means for supplying paste to the roller, means for controlling the suction through the periphery of said drum whereby the label will be held against the drum, released to permit contact thereof with the paste roller and then drawn against the drum and held to be advanced to the container to which it is to be applied, and strippers co-operating with the paste roller for removing the label therefrom and for directing it back against the surface of said drum.

7. In a container labeling machine, a magazine for holding a supply of labels uprightly on one edge, a drum rotatable about an upright axis, means for creating suction through the periphery of the drum for successively removing the labels from the supply, a paste applying roller rotatable about an upright axis, means for supplying paste to the roller, means for controlling the suction through the periphery of said drum whereby the label will be held against the drum, released to permit contact thereof with the paste roller and then drawn against the drum and held to be advanced to the container to which it is to be applied, the said paste supplying means embodying an upright pipe extending lengthwise of the paste roller and open at its upper end, and means for forcing the paste through said pipe and out of said open end.

8. In a container labeling machine, a magazine for holding a supply of labels uprightly on one edge, a drum rotatable about an upright axis, means for creating suction through the periphery of the drum for successively removing the labels from the supply, a paste applying roller rotatable about an upright axis, means for supplying paste to the roller, means for controlling the suction through the periphery of said drum whereby the label will be held against the drum, released to permit contact thereof with the paste roller and then drawn against the drum and held to be advanced to the container to which it is to be applied, the said paste supplying means embodying an upright pipe extending lengthwise of the paste roller and open at its upper end, means for forcing the paste through said pipe and out of said open end, and a splash plate extending over and spaced from the said open end of said pipe.

9. In a labeling machine, a container for holding a supply of labels uprightly on one edge, the forward portion of the container being mounted to swing laterally, a front for the container carried with said swinging portion, a drum rotatable about an upright axis and operating to successively remove the labels from the supply, an upright shaft, a retaining member connected with the shaft and adapted to engage over the adjacent edge of the labels to hold them, spaced members connected with the swinging portion of said container and between which members the said retaining member is disposed to alternately engage said spaced members for swinging said swinging portion of the container, means for actuating the shaft, and means controlled by the containers to be labeled for controlling the actuation of said shaft.

10. In a labeling machine, a container for holding a supply of labels uprightly on one edge, means for feeding the articles uprightly, means for removing the labels from the supply and applying the same to the articles as the latter are maintained upright, and means for causing a substantial portion of the supply of labels to be bodily moved in the direction of movement of the said removing means while the labels are being removed from the supply and with respect to the remaining portion of the supply of labels.

11. In a container labeling machine, a magazine for holding a supply of superposed labels, a rotatable drum having one or more openings through its periphery, means for creating suction through said openings for removing the lowermost label from the supply, means mounting said magazine for bodily movement with the drum during a portion of the cycle of operation of the drum and while the label is being removed from the supply, a paste applying roller into contact with which the label is moved by said drum, means for moving the paste applying roller into an inactive position, and fluid controlled means for moving the paste applying roller into an active position and against the stress of the last recited means.

12. In a container labeling machine, a magazine for holding a supply of superposed labels, a rotatable drum having one or more openings through its periphery, means for creating suction through said openings for removing the lowermost label from the supply, means mounting said magazine for bodily movement with the drum during a portion of the cycle of operation of the drum and while the label is being removed from the supply, a paste applying roller into engagement with which the label carried by the drum is moved, means for maintaining the paste applying roller in an inactive position, and means responsive to the said suction creating means for moving the paste applying roller into an active position with respect to the label.

13. In a container labeling machine, a magazine for holding a supply of superposed labels, a rotatable drum having one or more openings through its periphery, means for creating suction through said openings for removing the lowermost label from the supply, means mounting said magazine for bodily movement with the drum during a portion of the cycle of operation of the drum and while the label is being removed from the supply, a paste applying roller into engagement with which the label carried by the drum is moved, means for maintaining the paste applying roller in an inactive position, and means responsive to the said suction creating means for moving the paste applying roller into an active position with respect to the label, the said means which is responsive to the said suction creating means embodying a cylinder and piston element, one of which is stationary and the other of which is connected with the paste applying roller.

14. In a container labeling machine, a magazine for holding a supply of superposed labels, a rotatable drum, means for holding the label upon said rotatable drum, means mounting said magazine for bodily movement with the drum during a portion of the cycle of operation of the drum and while the label is being removed from the supply, a paste applying roller into engagement with which the label carried by the drum is moved, and control means for controlling the movement of the paste applying roller in response to the presence or absence of a label on the drum.

GARRETT W. MUDD.